April 28, 1925.

O. J. HARMS 1,535,466

MACHINE FOR PRODUCING DISKS FROM CORK OR CORK COMPOSITION

Filed March 19, 1921 — 7 Sheets-Sheet 1

April 28, 1925.

O. J. HARMS 1,535,466

MACHINE FOR PRODUCING DISKS FROM CORK OR CORK COMPOSITION

Filed March 19, 1921   7 Sheets-Sheet 2

Fig. 2.

Inventor
Oscar J. Harms
By Mann & Co
Attorneys

April 28, 1925.          1,535,466
O. J. HARMS
MACHINE FOR PRODUCING DISKS FROM CORK OR CORK COMPOSITION
Filed March 19, 1921          7 Sheets-Sheet 5

Inventor
Oscar J. Harms
By
Mann & Co
Attorneys

Patented Apr. 28, 1925.

1,535,466

UNITED STATES PATENT OFFICE.

OSCAR J. HARMS, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

MACHINE FOR PRODUCING DISKS FROM CORK OR CORK COMPOSITION.

Application filed March 19, 1921. Serial No. 453,776.

*To all whom it may concern:*

Be it known that OSCAR J. HARMS, a citizen of the United States, residing at Baltimore, in the State of Maryland, has invented certain new and useful Improvements in Machines for Producing Disks from Cork or Cork Composition, of which the following is a specification.

This invention has reference to a machine for producing disks of cork or cork compositions for any purpose but is especially useful in producing disks such, for example, as are utilized in conjunction with sheet-metal sealing caps or crowns that are extensively employed in sealing bottles and jars, and the disks produced may have the form of complete flat disks or they may be of a gasket or washer formation with a central opening.

Considerable difficulty is experienced in cutting cork and cork products because of the great friction produced between the cutter and the cork during the cutting operation, and in the case of natural cork, great waste and loss of material has resulted because of the unevenness in the thickness of the cork slabs which are first sliced and the slices then matched so that numerous disks may be cut or punched from the matched slices.

By means of the present invention I am able to very materially increase the total number of disks produced from a slab and also to produce those disks with a material saving in time and money over any means or mechanism heretofore practiced within my knowledge or experience.

The accompanying drawings illustrate an embodiment of the invention in a form of machine which has been found in actual practice to produce excellent results.

In the drawings,—

Fig. 1. illustrates, in a perspective diagrammatic way, an arrangement of elements for effectually producing disks of cork or cork compositions.

Fig. 13. shows in perspective one of the plugs that is to be cut into disks, and Fig. 14. illustrates a series of disks that have been severed or cut from a single plug.

Figure 2:
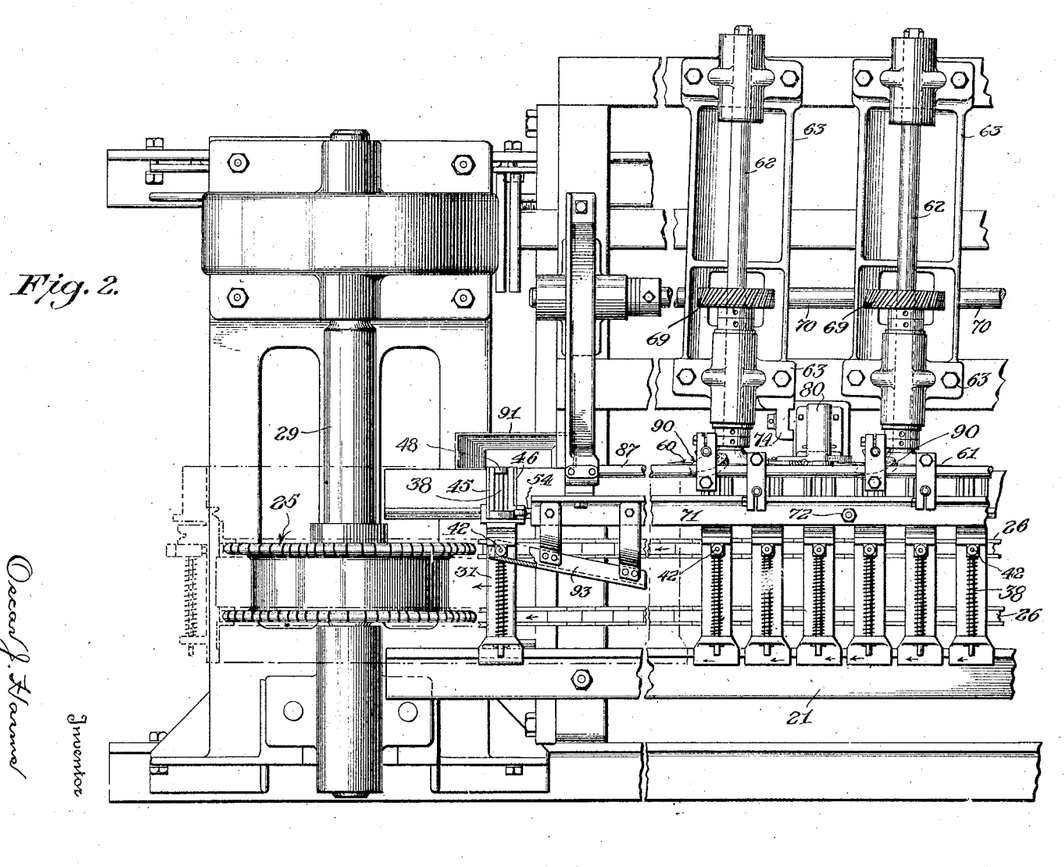
Fig. 2. shows one end or unit of the machine in top or plan view.
Figure 3:
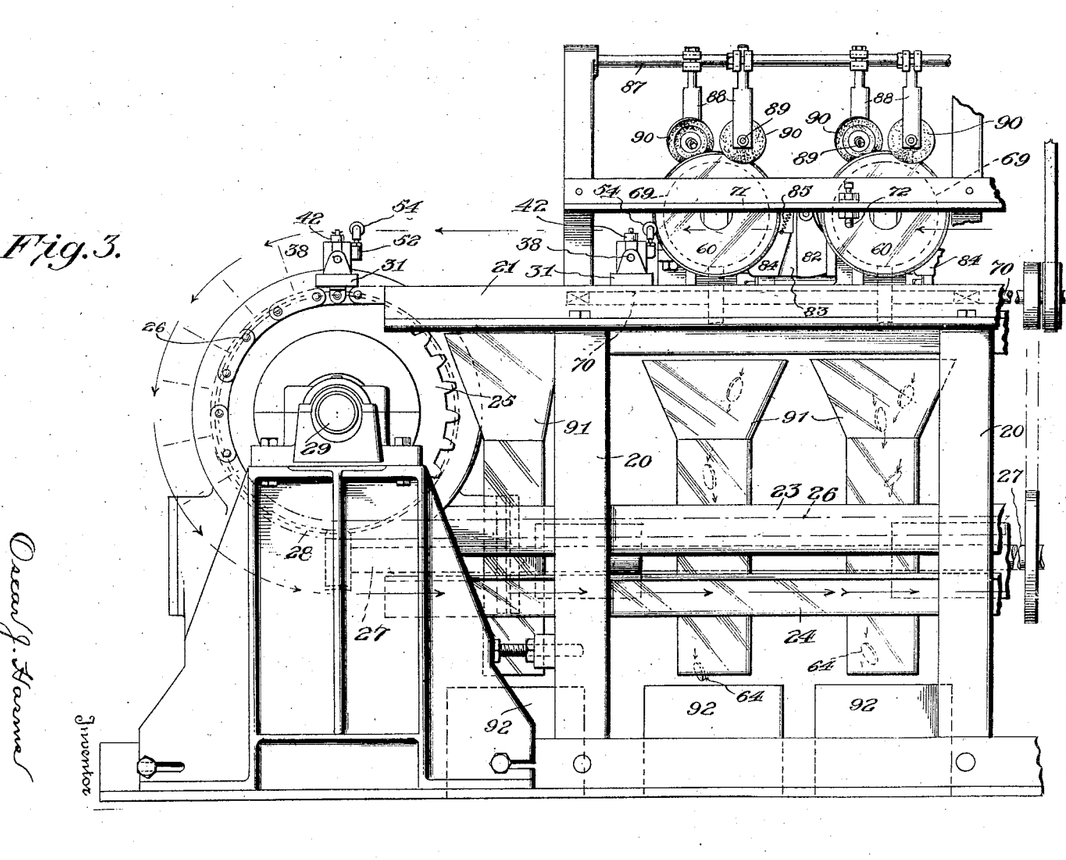
Fig. 3. illustrates the same in side elevation.

In carrying out the invention I make use of a suitable frame 20, which I have found expedient to design in units, one of which units is illustrated in top or plan view in Fig. 2 and in side elevation in Fig. 3. This unit idea enables the machines to be made longer or shorter by simply adding or omitting units, to suit the class of work that is to be done.

Figure 4:
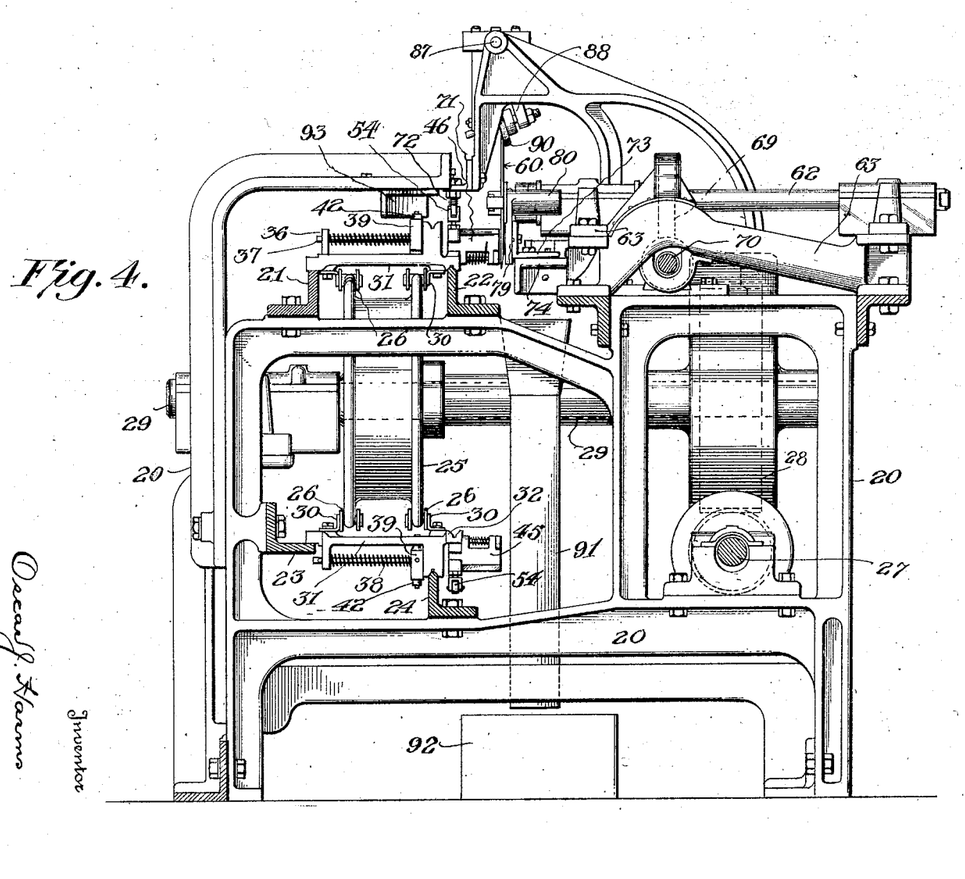
Fig. 4. shows a vertical cross-section through the machine.

When the desired number of units are coupled together, their frames will provide, in this instance, a pair of upper horizontal guide-rails 21 and 22 and a pair of lower horizontal guide-rails 23 and 24 respectively, as best shown in Fig. 4 of the drawings.

At each end of the sets of guide rails I provide sprocket wheels 25, one of which is illustrated in Figs. 2 and 3 and these wheels are mounted to revolve in a vertical plane so that their upper circumference will coact with the upper guide-rails 21 and 22 while their lower circumference will cooperate with the lower guide-rails 23 and 24 whereby to carry an endless chain 26 along the upper rails then down and around one sprocket and deliver the same onto the lower guide-rails and then around and over the other sprocket which will again deliver the chain onto the upper rails.

In this way the chain is made to travel continuously.

Power is derived from a lower horizontal shaft 27, through a worm drive in a casing 28, and from the latter by a horizontal shaft 29, on which one end-sprocket 25 is mounted, as can be seen in Figs. 2–3 and 4 of the drawing.

Obviously, these details in the structure may readily be varied without departing from the spirit of the invention.

Figures 9, 10:
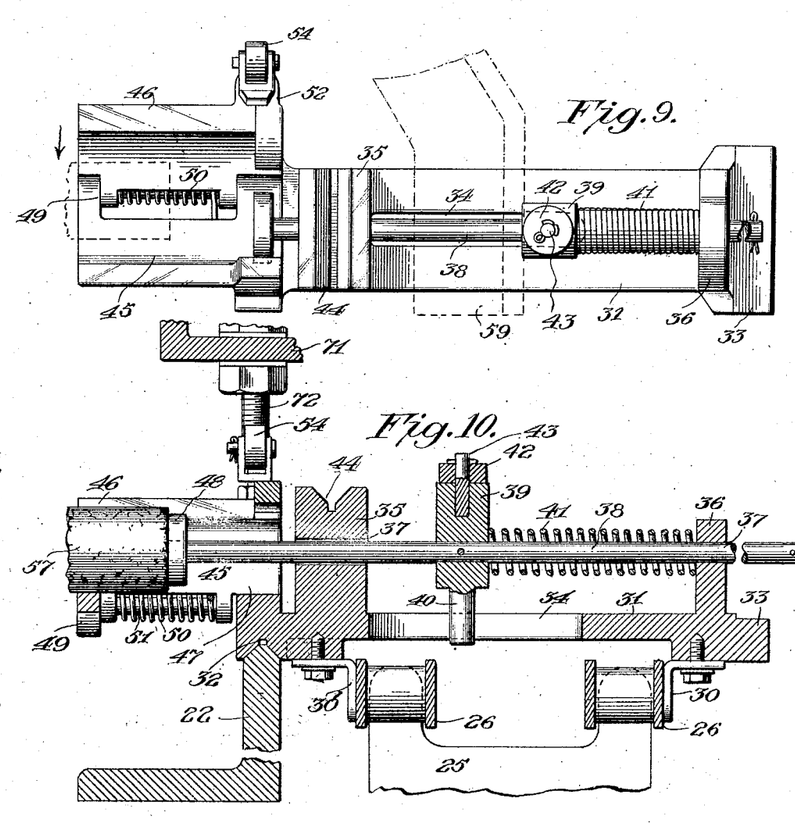
Fig. 9. illustrates one of the cork carriers in top or plan view.
Fig. 10. shows a vertical longitudinal sectional detail through one of the cork-carriers and its coacting devices.

The endless chain 26, has brackets 30 projecting from its links at regularly-spaced intervals, as best shown in Figs. 4 and 10 of the drawings, and these brackets are utilized in pairs to carry suitable cork-feed and clamp devices which carry the cork or cork composition that is to be cut into disks.

These cork feed and clamp devices are best illustrated in Figs. 2—9—10—11 and 12 of the drawings to which reference will now be made.

To more briefly designate these cork-feed and clamp devices they will hereinafter be referred to as clamps.

Each of these clamps comprises a substantially horizontal base-plate 31 with a lug or projection on the under side and at each end thereof to which the chain-link brackets 30 are bolted or screwed.

In the present instance, one end of each base-plate 31, has a V-shaped groove 32 which rides on a correspondingly-shaped edge of the upper guide rail 22 while the opposite end 33 of each base-plate is designed to have its lower side rest on top of the upper guide-rail 21 while it is traveling along its upper stretch, and slide along the lower rail 23 during its travel along the lower stretch of the belt's travel, as can be seen in Fig. 4 of the drawing.

Each clamp-base has a vertical slot 34 therein while at opposite ends of the slot the base is provided with two guide-lugs 35 and 36 respectively which extend at right angles to the flat longitudinal upper and lower surfaces of the base.

Each guide-lug 35 and 36 has a horizontal guide-perforation 37 therethrough so that a horizontal plunger-stem or rod 38 may be carried by each clamp.

A block 39 is rigidly connected to each plunger-stem 38 and each block has a pin 40 that projects therefrom and enters the vertical slot 34 in the base-plate so as to prevent rotation of either the block or the stem but permits said stem to be moved horizontally.

A coiled spring 41 encircles the stem and has position between the guide lug 36 and the block 39 so as to continuously exert a yielding pressure on the stem 38 in a direction toward the guide-lug 35.

Each block 39, is provided on its upper side with a roller 42, which is mounted on a vertical pin 43, so the roller may turn in a horizontal plane. The purpose of these rollers will presently be explained.

It will be noted that the upper side of each guide lug 35 of the clamps has a V-shaped groove 44, therein. This groove 44, is utilized to engage a similarly-shaped edge of the lower guide-rail 24, when the clamps are traveling with the lower stretch of chain, back to the operative position, as can be seen in Fig. 4.

It is to be understood that during the cutting operations, the clamps on the upper stretch of chain are utilized and have the position shown in Fig. 10, during that operation,—the direction of travel of the clamps and chain during the cutting operation being indicated in Fig. 3 by darts located adjacent thereto.

Each base 31 carries a clamp device at that end which is adjacent to the guide-lug 35 and each clamp device, in this instance, comprises a stationary member 45 and a movable member 46. These members have an interior shape that corresponds with the cross-sectional outline shape of the plug or block of cork or cork composition that is to be cut into disks. In this instance each of these members has a concave interior so that when they are in closed position they will form a circular chamber 47 which is preferably left partly open in the upper side. This chamber extends in a horizontal direction and its central longitudinal axis is in alinement with the longitudinal center of the plunger-stem or rod 38 which latter enters one end thereof and carries a head 48, as clearly shown in Figs. 10 and 11 of the drawings.

It will thus be understood that if the stem or rod 38 be reciprocated in the guide lugs 35 and 36 that the head 48 will be reciprocated in the chamber 47 of the clamp device.

Figure 12:
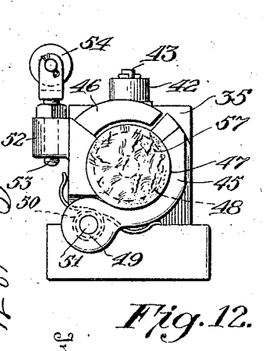
Fig. 12. shows the same in the closed position which it takes during the cutting operation.

The movable member 46 of the clamp is pivotally connected at 49, to the stationary member 45 and a coiled spring 50 is wound about the pintle 51; so that its ends may operate to yieldingly hold the movable member 46 in the closed position, as in Fig. 12.

This movable member, however, is designed in this instance to be intermittently opened and then closed for the purpose of permitting the stem 38 and its head 48, to feed the block or plug forward so that slices may be cut therefrom.

In the present construction, each movable member 46 has a lug 52 at its rear side, that is, rear with respect to the direction of its travel, and a stem 53 is rigidly secured in this lug and carries a contact roller 54 at its upper end, which rollers are brought into successive contact with certain actuating devices, as the clamps are carried along by the endless chain, and by contact with said devices the movable members are momentarily opened while the plug or block in the clamp chamber is fed forward. This operation will presently be more fully explained.

In the operation of the present machine the clamp devices are caused to travel continuously with the endless chain,—the clamps being sustained on the upper horizontal rails 21 and 22 during the operative portion of their travel.

Figures 1, 13, 14:
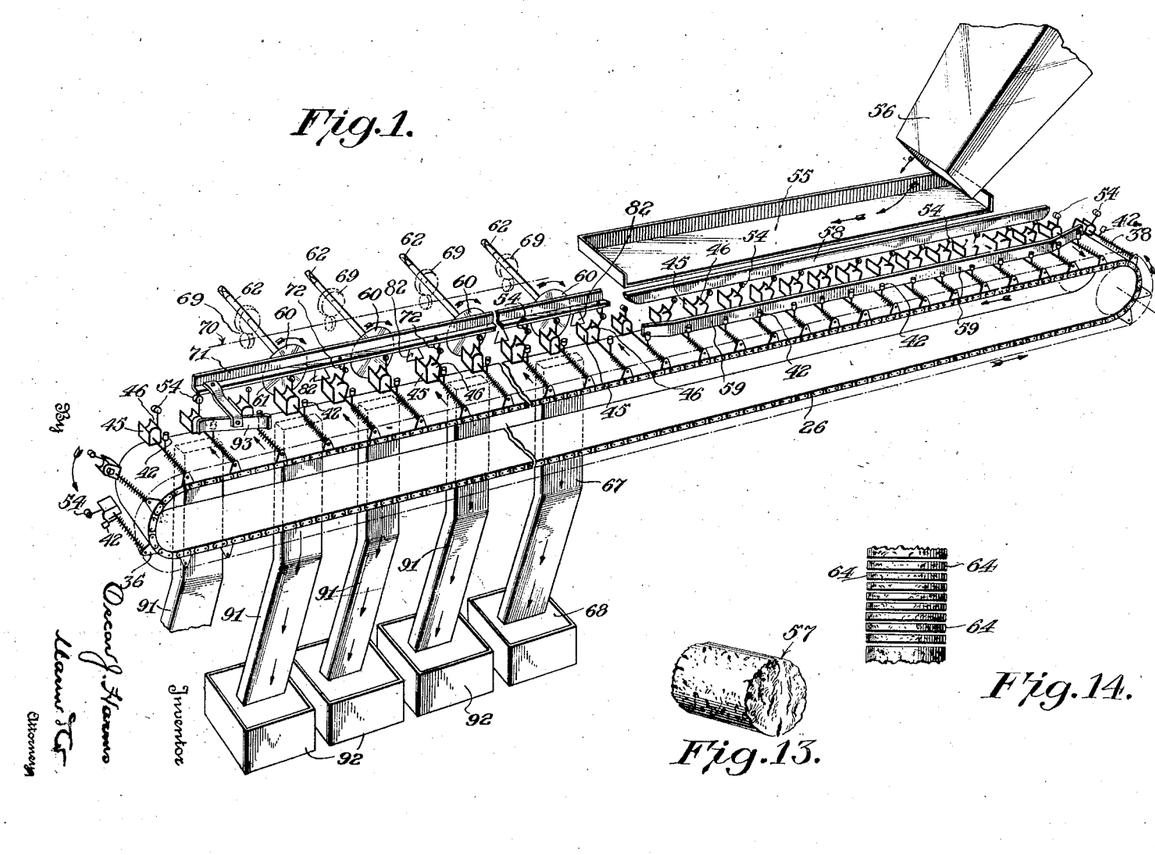

The cycle of operation is indicated in the diagrammatic perspective view shown in Fig. 1, of the drawing wherein the complete chain 26 is indicated with its upper and lower stretches but the sprocket wheels 25 at each end being omitted.

The clamps 45—46 are shown in an endless series and the rollers 54 are indicated for each movable clamp member 46.

In the diagrammatic view of Fig. 1, the rollers 42, for controlling the horizontal movement of the plunger stems or rods 38, are also indicated.

At the feed end of the machine I provide, in practice, a table 55, on which the plugs of cork or cork composition 57 are delivered in any suitable way, such for example as by means of a chute 56.

These cork plugs 57 are placed by operators in the chambers of the clamps as the latter travel past the table and at this time the clamps must be held open and the plunger stems and heads must be retracted so the plugs can be readily inserted therein.

Figure 11:
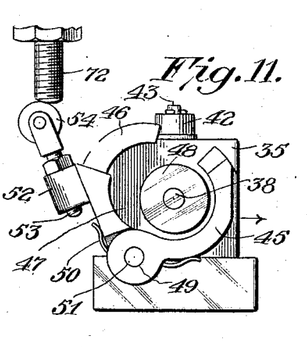
Fig. 11. illustrates an end view of one of the cork carriers the same being open to permit the cork to feed forward.

To hold the clamps open I provide a horizontal cam rail 58 which is so located that the rollers 54, of the movable clamping members may engage the lower horizontal edge of the rail and swing rearwardly into a trailing position, thereby swinging the movable clamp into the position shown in Fig. 11 and holding the said clamp in the open position throughout its travel past the table.

To hold the plunger stems retracted, also while passing the table 55, I provide a second cam rail 59 which is sustained in an edgewise position over the stems 38, so that the rollers 42 on the block, 39, will be pushed laterally carrying the stems 38 and the heads 48 with them. This cam-rail 59 therefore serves to hold the stems and their heads retracted in the clamp chambers 47, while the clamps pass the table where the cork plugs 57 are inserted.

It is believed to be obvious from the showing in Fig. 1, of the drawing that as the cam rails 58 and 59 terminate at substantially the same point, that rollers 42 and 54 will be released substantially at the same time and the clamps will therefore close about the plug while the pressure of the spring 41, will move the stem 38 forward until its head 48, engages the inner end of the plug that is held in the clamp, as clearly shown in Fig. 10 of the drawing.

After the plugs 57 are clamped in the holders they are moved forward continuously with the holders and endless carrier, and during this movement, the projecting end of the plug is acted upon by the first of a series of rotary cutters, whereby the first slice of the plug is cut while the clamp holds the plug; then the clamp opens while the plunger moves the plug forward a distance equal to the thickness of the disk that is to be cut by the next cutter, and this operation of clamping during the cutting, then opening while the plug is fed forward, is repeated, until the plug is entirely sliced into disks.

In the diagrammatic view (Fig. 1) a series of four cutters 60, are shown, but in practice a greater number are employed, although this is immaterial.

Considerable difficulty is experienced in cutting through cork with rotary cutters and this difficulty is multiplied when thin disks of substantially uniform thickness are to be cut from plugs. The friction set up by this cutting operation is very great and it is exceedingly difficult to keep the cutters sharp enough to commercially operate them.

By means of my improved machine, I have overcome these difficulties and have succeeded in producing machines that will commercially produce the disks in large quantities, with a considerable saving in material and at much less expense than as heretofore practiced.

In the first place I produce the plugs 57 by an improved process and an improved machine both of which form the subject of companion applications for patents executed simultaneously herewith and bearing respectively serial numbers and filing dates as follows:—453,777 and 453,779 both filed March 19th, 1921.

These plugs 57, when cut from natural cork slabs, are cut in a direction from the outerside of the slab, which is termed the "back," to the inner side of the slab which is termed the "belly." The "back" of the cork slab is that side which is exposed to the elements and weather and is quite tough and hard while the "belly" of the slab is that side which grows next to the trunk of the tree and is much more soft and flexible but still unfit for use as a disk surface, if that disk is to be utilized as a sealing gasket in a bottle cap or crown.

In cutting the disks from plugs it is therefore necessary to first cut off the end slice and thus true the end of the plug. This end slice, while useless as a sealing disk, may be ground up with scrap and moulded into artificial slabs from which plugs may be cut and afterward sliced by the machine of this invention.

Figure 6:
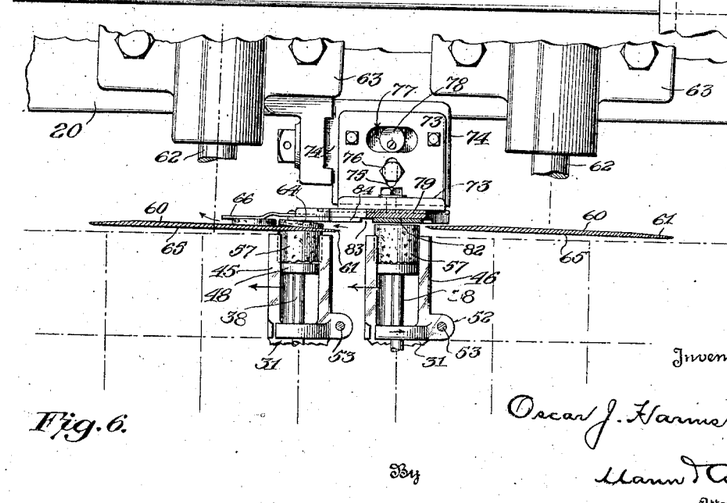
Fig. 6. shows a horizontal or sectional plan view of the devices shown immediately below the line 6—6 on Fig. 5.
Figures 7, 8:
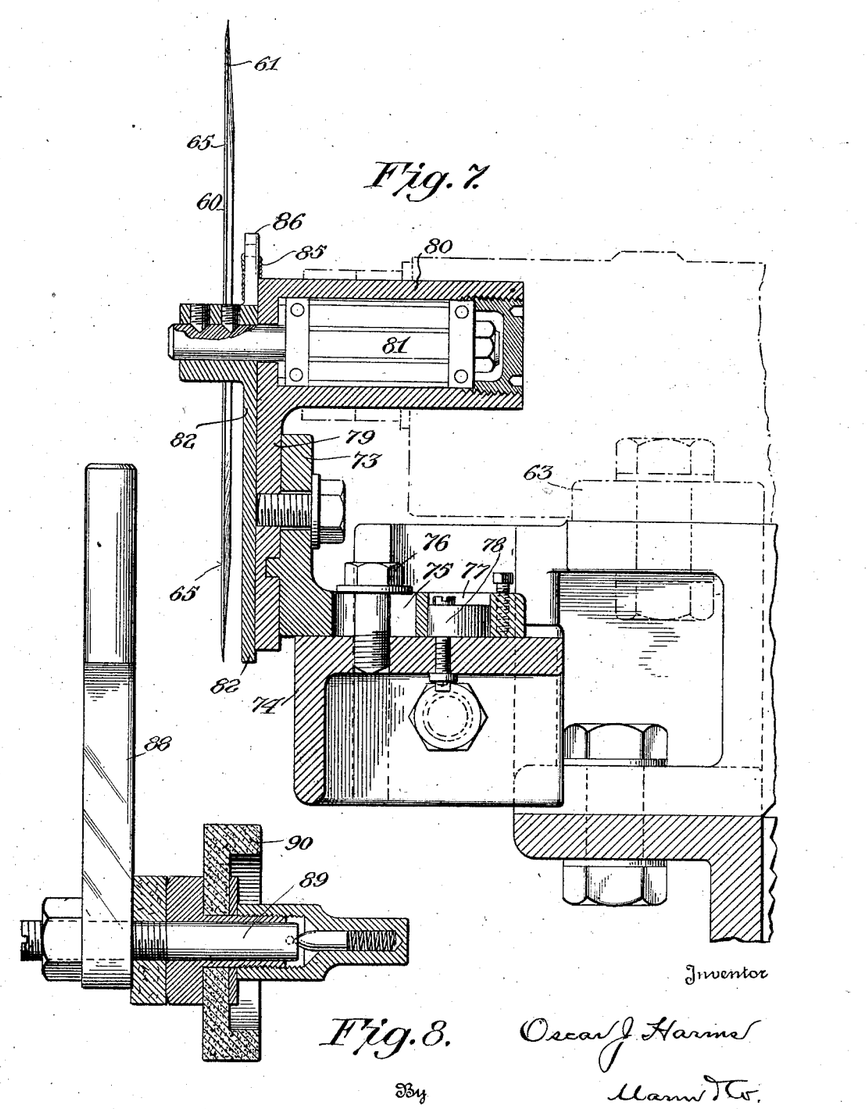
Fig. 7. illustrates a much enlarged vertical sectional detail through the movable oscillating plate, as the same would appear if cut on the line 7—7 of Fig. 5.
Fig. 8. shows an enlarged vertical sectional detail through one of the grinders and its supports as the same would appear if cut on the line 8—8 of Fig. 5.

The cutters 60, in the machine herein illustrated are of a circular form and have a beveled knife-edge 61, as best illustrated in Figs. 6 and 7 of the drawings, although the same can be seen in Fig. 2 of the drawing.

These cutters are carried on the ends of horizontal shafts 62 which latter are supported in brackets 63, that are sustained at the upper side of the machine frame.

Attention is directed particularly to Fig. 2 of the drawing for the purpose of showing that the brackets 63 are so placed on the frame of the machine that the cutter shafts 62, while having positions in a horizontal plane, are not at true right angles to the line of travel of the clamps and endless conveyer but are slightly inclined with respect to said line of travel. This slight inclination of the cutter-shafts 62, throws the flat faces of the cutter disks 60, out of parallelism with the projecting ends of the cork plugs 57 that are held in and carried by the clamps, as is best illustrated in Fig. 6 of the drawings so that as the beveled knife-edge 61 of the cutter enters the cork block or plug to sever a disk 64 therefrom, the flat face 65 of the cutter disk will not have frictional contact with the entire cross-sectional surface of the block or plug 57, during the cutting operation, which frictional contact would produce sufficient heat to cause the cork to smoke and would also tend to injure the cutters in addition to displacing the plugs or blocks in the clamps.

As the cutters enter the plugs or blocks to sever a disk therefrom, the disk is turned laterally at the rear side of the cutter and passes under a spring finger 66 which prevents the disks from being scattered as they are completely severed from the block or plug and simply retains said disks and allows them to drop, one at a time into a chute 67, from which they discharge into a suitable receptacle 68.

A separate chute is provided for the disks cut by each cutter so that the disks may be kept separate,—it being found in practice that the first disk cut is of little value as a disk while the next disk is of a grade that is less desirable than the succeeding disks and by thus separating the disks a more ready inspection and uniform grade of disk can be selected for the best grade, while others may be utilized for some purposes not requiring as perfect a seal.

The cutter shafts 62, are driven through the aid of worm gears 69 that mesh with worms (not shown) but carried on a horizontal drive shaft 70 beneath said shafts.

After each disk is sliced or cut from a block or plug 57, the plugs must be fed forward and as the plugs are held in the clamps it becomes necessary to relieve the clamps momentarily while the forward feeding of the plugs takes place. This is effected by means which will now be briefly explained.

By reference to Figs. 1 to 5 inclusive it will be noted that a horizontal rail 71 is sustained above the traveling row of horizontal clamps and adjacent to the rear flat faces 65 of the cutters.

This rail 71 is stationary in that it is supported by suitable means from the frame of the machine, and along that rail, and at points between adjacent cutters 60, I provide depending trip lugs or bolts 72, the lower ends of which project down far enough, below the rail to extend in the path of the rollers 54, of the movable clamp members 46, as clearly shown in Fig. 10, and diagrammatically illustrated in Fig. 1 of the drawing.

As the clamp devices are traveling from one cutter to another, their rollers 54, will strike the trip lugs or bolts 72, which causes the movable clamp member 46 to momentarily open as illustrated in Fig. 11, and by thus opening, the clamps release the block or plug while the plunger head 48 and stem 38, are pushed forward by the spring 41, so as to advance the block or plug in the clamp. As soon as the rollers 54 pass the lug or bolt 72, however, the clamp again engages the block or plug and holds the same while the next cutter severs a disk therefrom.

This operation of releasing the clamps and feeding the block or plug forward between cutters, necessitates providing means to determine the extent of forward feed of the block or plug, otherwise disks of unequal thickness would be severed from the block or plug.

To determine this forward feed of the block or plug, I provide between adjacent cutters, an adjustable gage plate having novel features of construction, as will now be explained.

By reference to Figs. 4–5–6 and 7 of the drawings it will be noted that an angle-iron bracket 73, is seated on a supporting bar 74 of the machine frame so as to be positioned between adjacent cutters.

These brackets 73 are provided in their horizontal portions with slots 75 which extend vertically therethrough so that adjusting screws 76 carried by the bar 74 may project through the slots and adjustably secure the brackets.

In order however to effect a delicate adjustment of the brackets in a direction toward or from the ends of the passing plugs or blocks and the ends of the clamps, I provide each bracket with a slot 77, and I eccentrically mount a head 78, on the bar 74 so that the head may enter the bracket-slot so that when the head is rotated or turned it will cause the bracket to move back or forth on the bar 74.

The vertical portion of each angle-iron bracket sustains a vertical plate 79 whose upper end carries a horizontal barrel or bearing 80. This bearing sustains a short stem or shaft 81, one end of which projects so as to carry a vertical stop-plate 82. This plate 82 is therefore pivotally sustained in a vertical plane slightly forward of the entering edge of the cutters the distance being equal to the thickness the disk is to have when cut from the plug.

Figure 5:
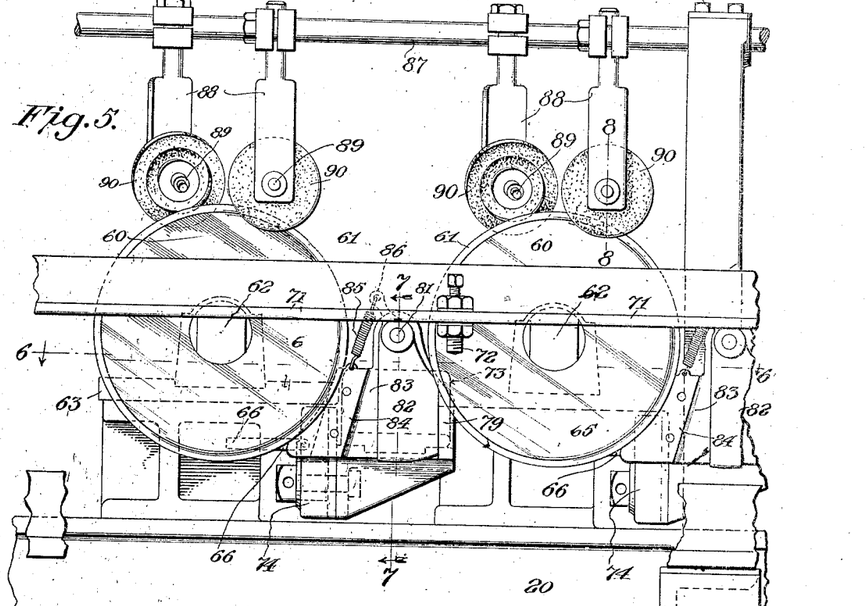
Fig. 5. illustrates a front face view on an enlarged scale of two adjacent cutters; the grinders for the same and a movable oscillating plate that is located between the cutters.

By reference to Figs. 5 and 6 of the drawings, it will be noted that the plate 79 against which the stop-plate 82, slides when the latter swings, is provided with a recess 83 and that a stationary stop-strip 84, is provided on the plate 79, at one side of the recess whereby to limit the swinging movement of the plate 82. The vertical surfaces however of these two plates 82 and 84 is in the same vertical plane so that the end of the plug or block of cork will pass from the movable stop plate onto the stationary plate or strip without hindrance.

A spring 85, is attached to an arm or lug 86 that projects from the movable stop-plate 82, so that when the end of the plug or block passes from contact with said latter plate the spring will immediately return the plate to its normal position as is shown in Fig. 5 of the drawing.

The operation of this movable gage or stop plate 82 is therefore as follows:

When the clamps leave a cutter they are momentarily opened by the lugs or bolts 72, and at this time the plug or block 57, will have position at the side of a movable gage or stop-plate 82. Therefore when the clamps open, the spring-operated stems 38, will push the plugs or blocks forward until their forward ends seat against the gage plate 82. This is done while the clamps and plugs are advancing with the carrier. When the ends of the moving plugs seat against the gage plates, the clamps immediately close about the plugs and the plug-ends then by their frictional contact with the gage-plates will cause the latter to swing as the plugs continue to advance toward the next cutter. By thus permitting these gage-plates to swing in the direction of the travel of the plugs considerable friction is avoided as the gaging of the plugs takes place and until the clamps have had ample time to grasp the plug again to hold it in its advanced position ready for the next cutter to slice off another disk.

In practicing this invention I have found the cutting of cork disks by circular cutters to involve many difficulties and these were not overcome by me until I discovered that the cutters will perform commercially if they are subjected to a continuous grinding to maintain their knife-edge.

For this reason I have provided each cutter with a grinding device which will now be briefly described, reference being made particularly to Figs. 5 and 8 of the drawings.

Above the row of cutters 60, I provide a horizontal rod 87, which I sustain in any suitable manner from the frame, and on this rod I pendantly hang a series of arms 88.

The lower ends of these arms 88, carry a horizontal stem 89 on which a grinder-wheel 90 is carried.

These arms and their grinder-wheels are so hung that one wheel may contact with one beveled face of a circular cutter 60, while another wheel may contact with the opposite face of the same grinder,—the two grinders however being so adjusted that one will grind a long bevel while the other will simply grind a short bevel on the cutter.

The contact of these grinders with the cutters is only slight and just sufficient to maintain the desired edge without grinding away the cutter too much.

From the foregoing explanation it is believed to be clear that the plugs or blocks are cut and fed forward and then again cut and fed forward repeatedly until the entire plug is sliced into disks,—the successive slices or disks being conveyed by chutes 91 to separate receptacles 92.

It sometimes happens in the operation of the machine that the extreme end of the block or plug becomes stuck in the clamps and the pressure of the springs 41, on the stems 38 and heads 48, is insufficient to eject these ends.

To positively effect the discharge of the plug-end from the clamps after the last cutter is passed, I provide a short inclined section of cam track 93 adjacent to but over the line of travel of the endless series of clamps so that as each clamp passes this cam-track 93, the latter will engage the ejector rollers 42 on the blocks 39, and positively move the stems 38 and head 48, a stroke that will clear the clamps of any remnants of plugs or blocks that may have remained therein.

Having described my invention, I claim,—

1. In a machine for cutting sealing-disks from cork plugs the combination with an endless series of clamp devices, of two spaced-apart upper horizontal supports, two spaced-apart lower horizontal supports said upper and lower horizontal supports sustaining some of said clamp devices, a circular device at each end of said upper and lower supports to direct the clamp devices while the latter travel between said two sets of supports, a flexible device traveling around said two circular devices and between the two upper and two lower horizontal supports said flexible device being connected to each of the clamp-devices to cause them to travel along said supports, a series of cutters along the path of the clamp-devices and means for actuating the clamps between successive cutters to feed the cork plug forward.

2. The combination with an endless series of clamp devices to hold material to be cut, of a feed plunger for each clamp, a series of cutters, means for moving the clamp devices and plungers past the series of cutters, means for opening the clamps between successive cutters, means for moving the plungers in the clamps when the latter are opened and means for closing the clamps before the next cutter is reached.

3. The combination with an endless conveyer having an upper horizontal stretch and a lower horizontal stretch, of a series of clamp devices attached to said conveyer, an upper horizontal rail for engaging the said clamp devices, a series of rotary cutters along the upper horizontal stretch of the conveyer, said rail opening a series of the clamps to enable them to receive the material to be cut, means for closing said clamps after they pass said rail and also while the material is being cut and means for momentarily opening the clamps while they travel from one cutter toward another to enable the material to be fed forward.

4. The combination with an endless series of traveling clamping devices to hold material to be cut, of a spring-pressed plunger for each clamp to press the material forward, a plurality of cutters located at intervals adjacent to the path of the clamps, means for holding the clamps open during a portion of their travel to permit the material to be placed therein, means for holding the plungers retracted while the clamps are held open, means for closing the clamps as they approach the first cutter, means for opening the clamps as they move with the material to the next cutter to permit the plungers to feed the material forward and means for closing the clamps again as they approach the next cutter.

5. In a machine for cutting successive disks from cork plugs the combination with an endless conveyer having an upper horizontal stretch and a lower horizontal stretch, of a series of rotary cutters along the upper horizontal stretch of the conveyer, a series of clamp-devices attached to said conveyer and each clamp having a plunger, an upper horizontal rail for engaging the clamps as they move to open the latter to enable them to receive the plugs to be cut, a cam-track for holding the plunger of each clamp retracted while the clamp is open, means for closing said clamps after they pass said rail and also while the material is being cut and means for momentarily opening the clamps while they travel from one cutter to another to allow the plungers to move the plugs forward in the clamps.

6. In a machine for cutting successive disks from cork plugs the combination with an endless conveyer having an upper horizontal stretch and a lower horizontal stretch, of a series of rotary cutters along the upper horizontal stretch of the conveyer, a series of clamp-devices attached to said conveyer and each clamping having a spring-actuated clamp-jaw and a spring-actuated plunger, means for successively engaging the clamp-jaws to hold them open while plugs are placed therein, means for holding the spring-pressed plungers retracted while the jaws are held open, and means for momentarily opening the jaws of the clamps while they move from one cutter to the next cutter to permit the spring-actuated plungers to feed the plugs forward after each disk is cut therefrom.

7. The combination with an endless series of traveling clamps, of a plurality of rotary cutters past which the said clamps travel, a movable gage-plate between successive cutters, means for moving the material toward a gage-plate after it leaves a cutter and causing the plate to move along with the material toward the next cutter.

8. The combination with an endless series of traveling clamps, of a plurality of rotary cutters past which the said clamps travel, a pivotally sustained gage-plate between successive cutters, means operating after each cut to move the material to the pivoted gage-plate and causing the latter to swing as the material moves toward the next cutter whereby to eliminate friction.

9. The combination with an endless series of traveling clamps, of a plurality of rotary cutters past which said clamps travel, a movable gage-plate between successive cutters, means for moving the material in the clamps and toward a gage-plate after it leaves a cutter and causing the plate to move along with the material toward the next cutter, and means for returning the gage-plate to its initial position as the material passes therefrom to the next cutter.

10. In a machine for cutting sealing disks from cylindrical plugs the combination with an endless flexible conveyer, of a series of base plates attached to and carried by the conveyer, a clamp device at one end of each base-plate and shaped to engage a cylindrical plug, a plunger device sustained by each base-plate and movable in each clamp, means for opening and closing the clamps at intervals during their travel to free the plug therein and allow the plunger to move the latter forward and means along the path of the clamps to cut disks from the plugs after the closing movements of the clamps.

11. In a machine for cutting sealing disks from cylindrical plugs the combination with an endless flexible conveyer, of a series of base-plates carried by the conveyer, guide rails to sustain the base plates and guide them in a straight path, a clamp device at one end of each base-plate and shaped to engage and carry a cylindrical plug, a spring-pressed plunger in each clamp device, means for intermittently opening the clamps to permit the plunger to feed the plug forward in its clamp and a series of cutters to cut disks from each plug after each forward movement of the latter in the clamps.

12. In a machine for cutting disks from cork plugs the combination with a pair of upper horizontal supporting rails, of a pair of lower horizontal supporting rails, a sprocket-wheel at each end of the two sets of rails, an endless chain traveling from one sprocket to the other and passing between said upper and lower sets of rails, clamp devices attached to said chain but supported on said two sets of rails each clamp device having a movable jaw and a spring-actuated plunger, a series of cutters, means for holding the movable jaws of the clamps open while plugs are placed therein, means for holding the clamp-plungers retracted while the jaws are thus held open and means for momentarily releasing the jaws while the clamps move from one cutter to the next.

In testimony whereof I affix my signature.

OSCAR J. HARMS.